US006901304B2

(12) United States Patent
Swan et al.

(10) Patent No.: US 6,901,304 B2
(45) Date of Patent: May 31, 2005

(54) ITEM TRACKING SYSTEM ARCHITECTURES PROVIDING REAL-TIME VISIBILITY TO SUPPLY CHAIN

(75) Inventors: Richard J. Swan, Portola Valley, CA (US); Peter S. Ebert, Menlo Park, CA (US); Tao Lin, Mountain View, CA (US); Jie Weng, Sunnyvale, CA (US); Hartmut K. Vogler, Foster City, CA (US); Brian S. Mo, Palo Alto, CA (US)

(73) Assignee: SAP Aktiengesellschaft, Walldorf (DE)

( * ) Notice: Subject to any disclaimer, the term of this patent is extended or adjusted under 35 U.S.C. 154(b) by 211 days.

(21) Appl. No.: 10/232,764

(22) Filed: Aug. 30, 2002

(65) Prior Publication Data

US 2003/0132854 A1 Jul. 17, 2003

Related U.S. Application Data

(60) Provisional application No. 60/353,198, filed on Feb. 1, 2002, and provisional application No. 60/347,672, filed on Jan. 11, 2002.

(51) Int. Cl.[7] .............................................. G06F 19/00
(52) U.S. Cl. ........................... 700/115; 700/90; 705/28; 340/572.1
(58) Field of Search ............................. 340/572.1, 10.1; 700/90, 95, 115; 705/28, 29

(56) References Cited

U.S. PATENT DOCUMENTS

| 4,974,166 A | 11/1990 | Maney et al. |
| 5,166,884 A | 11/1992 | Maney et al. |
| 5,469,363 A | 11/1995 | Saliga |
| 5,936,527 A | 8/1999 | Isaacman et al. |
| 5,963,134 A | 10/1999 | Bowers et al. |
| 5,971,592 A | 10/1999 | Kralj et al. |
| 6,021,443 A | 2/2000 | Bracho et al. |
| 6,032,127 A | 2/2000 | Schkolnick et al. |

(Continued)

FOREIGN PATENT DOCUMENTS

| DE | 4341880 | 6/1995 |
| DE | 19623893 | 12/1997 |
| DE | 19844631 | 4/2000 |
| DE | 19951060 | 5/2000 |
| DE | 19955120 | 5/2001 |
| EP | 0908643 | 4/1999 |
| EP | 0913758 A2 | 5/1999 |
| EP | 1174807 A1 | 1/2002 |
| GB | 2308947 | 7/1997 |
| WO | WO 00/45324 | 8/2000 |
| WO | WO 02/47014 | 6/2002 |

OTHER PUBLICATIONS

Hoffman, Kurt C., "Real–time Location Systems Take Asset Tracking to New Level," http://www.supplychainbrain.com/archives/10.01. Oct. 2001, 5 pp., XP002259982.

"KnowNow Unveils 'n–way' EAI over the Internet," SEARCHWEBSERVICES, Jun. 28, 2001, 2 pp., XP002259981.

(Continued)

Primary Examiner—Jayprakash N. Gandhi
(74) Attorney, Agent, or Firm—Fish & Richardson P.C.

(57) ABSTRACT

Methods and apparatus, including computer program products, for providing multiple enterprises real-time access to information about items in a supply chain. Tags bound to items are read and information read from the tags and location information about the tags is provided by at least two enterprises and used to maintain disposition information about the items, which is made visible to enterprises in the supply chain. The tags can be radio-frequency identification tags having each having an ePC (electronic product code) as unique tag identifier. Visibility of the disposition information can be controlled through authorization. Visible information can include relationships between particular items and business documents such as order and shipping documents. With shipping documents visible, information read from item tags can be used to confirm the identify or completeness of a shipment.

13 Claims, 12 Drawing Sheets

U.S. PATENT DOCUMENTS

| | | | |
|---|---|---|---|
| 6,148,291 | A | 11/2000 | Radican |
| 6,177,860 | B1 | 1/2001 | Cromer et al. |
| 6,195,006 | B1 | 2/2001 | Bowers et al. |
| 6,259,367 | B1 | 7/2001 | Klein |
| 6,292,894 | B1 | 9/2001 | Chipman et al. |
| 6,301,621 | B1 | 10/2001 | Haverstock et al. |
| 6,317,028 | B1 * | 11/2001 | Valiulis ..................... 340/10.1 |
| 6,321,230 | B1 | 11/2001 | Joslin et al. |
| 6,496,806 | B1 * | 12/2002 | Horwitz et al. ............... 705/28 |
| 6,671,698 | B2 | 12/2003 | Pickett et al. |
| 6,684,119 | B2 | 1/2004 | Burnard et al. |
| 2001/0000019 | A1 | 3/2001 | Bowers et al. |

OTHER PUBLICATIONS

Margulius, David L., "Dawn of Real–time enterprise," Infoworld, http://www.infoworld.com/article/02/01/17/020121 fetca_1.html, Jan. 17, 2002, 2 pp., XP002259980.

Sanjay Sarma, *Auto–ID Center: Lessons Learned*, Auto–ID Center– MIT, Nov. 23, 2001.

Auto–ID Center Website—Technology Section, *Introduction to Auto–ID*, http://.www.autoidcenter.org/technology, Jan. 7, 2002.

Sylvia Tiisetso Khabele, *RFID Security, CSC400W: Network and Internetwork Security*, skhabele@cs.uct.ac.za, May 18, 2001.

Kevin R. Sharp, Senior Technical Editor, IDSystems.com, *Planning for RFID Ubiquity*, http://www.idsystems.com/reader/2000 07/plan0700.htm, Jul. 2000.

Raghu das et al., *The Internet of Things*, IDTechEx Ltd., http://www.idtechex.com/book9.html, 2001.

David L. Brock, *The Physical Markup Language*, MIT Auto–ID Center, Feb. 2001.

George Cole, *The little label with an explosion of applications*, Financial Times– FT.com, http://news.ft.com/ft/gx-.cgi/ftc?pagename=View&c=Article&cid=FT30414MGWC, Jan. 14, 2002.

EAN International, Uniform Code Council, Inc., *EAN.UCC White Paper on Radio Frequency Identification*, Nov. 1999.

Sanjay Sarma et al., *White Paper– The Networked Physical World*, MIT Auto–ID Center, Oct. 1, 2000.

John Stermer, *Radio Frequency ID: A New Era for Marketers?*, Consumer Insight, Winter 2001.

Mary Ann Falkman editor, *RFID smart labels track chilled foods door to door*, Packeting Digest, Nov. 2000.

Cheryl Rosen, *RFID Chips Put To The Test*, Informationweek.com, http://www.informationweek.com/story/IWK20010628S0008, Jul. 2, 2001.

M–Lab—A Joint Initiative of ETH Zurich and HSG, *The Mobile and Ubiquitous Computing Lab—Project Plan*, www.m–lab.ch, English version 1.02e, St. Gallen/Zurich, Jun. 21, 2001.

Rachel Melcer, *P&G's Vision*, Business Courier, May 18, 2001.

Elgar Fleisch et al., *From computing visions to show cases*, M–Lab, First M–Lab Steering Committee Meeting, Nov. 22–23, 2001, Zurich.

Charles J. Murray, *Motorola cuts bar code replacement effort*, EE Times, Nov. 16, 2001.

Savi Technology Inc. Press Release, *CHEP to deploy Savi Technology's Asset Management Software*, Nov. 6, 2001.

Jay Wrolstad, *American Airlines Deploys Wireless System to Monitor Cargo*, CRNDaily.com, Oct. 12, 2001.

Jay Wrolstad, *Wireless tags help grocers deliver fresh food*, CRMDaily.com, Oct. 2, 2001.

SAMSys, Inc. press release, *International Paper selects SAMSys Technologies as primary RFID reader supplier*, Jan. 5, 2001.

Infineon press release, *Infineon enters fast growing "smart label" market with my–d, defines new paradigm for cost effective radio frequency identification solutions*, Sep. 11, 2001.

MIT Auto–ID Center, MIT–AUTOID–WH–001, "The Networked Physical World", MIT Auto–ID Center, Dec. 2000.

David L. Brock, MIT Auto–ID Center, MIT–AUTOID–WH–002, "The Electronic Product Code", Jan. 2001.

Auto–ID Center, Technical Manual, "The Object Name Service", Version 0.5 (Beta), Oat Systems & MIT Auto–ID Center, Feb. 1, 2002.

KnowNow Product Brief: "KnowNow Architecture Overview", 2002.

Segall et al., "Content Based Routing with Elvin4" Jun. 2000.

White Paper, SAP® Consumer Products, From Demand Planning to Vendor Managed Inventory with SAP APO. "DRP and VMI for the Consumer Products Industry", 1999.

* cited by examiner

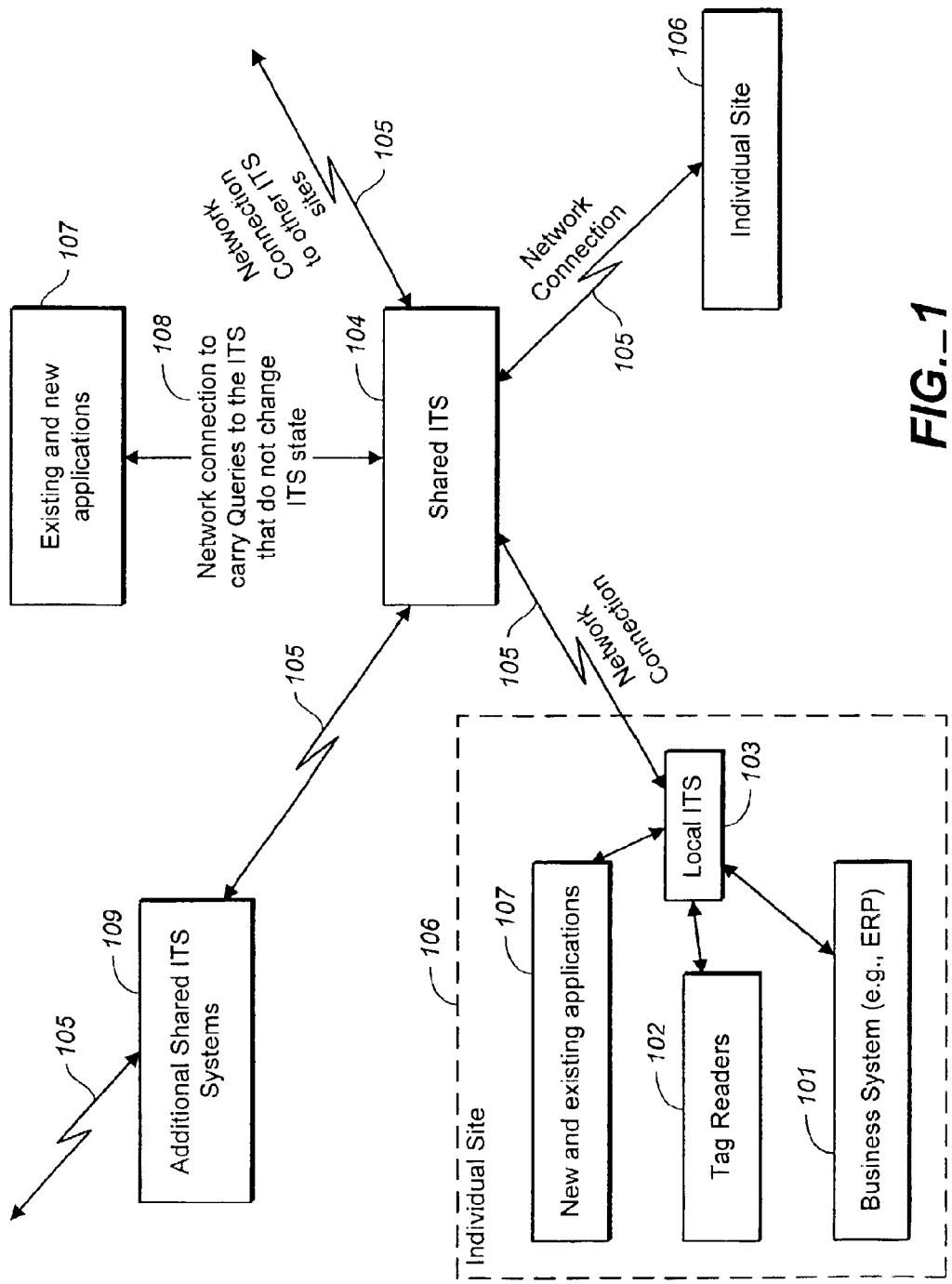
FIG._1

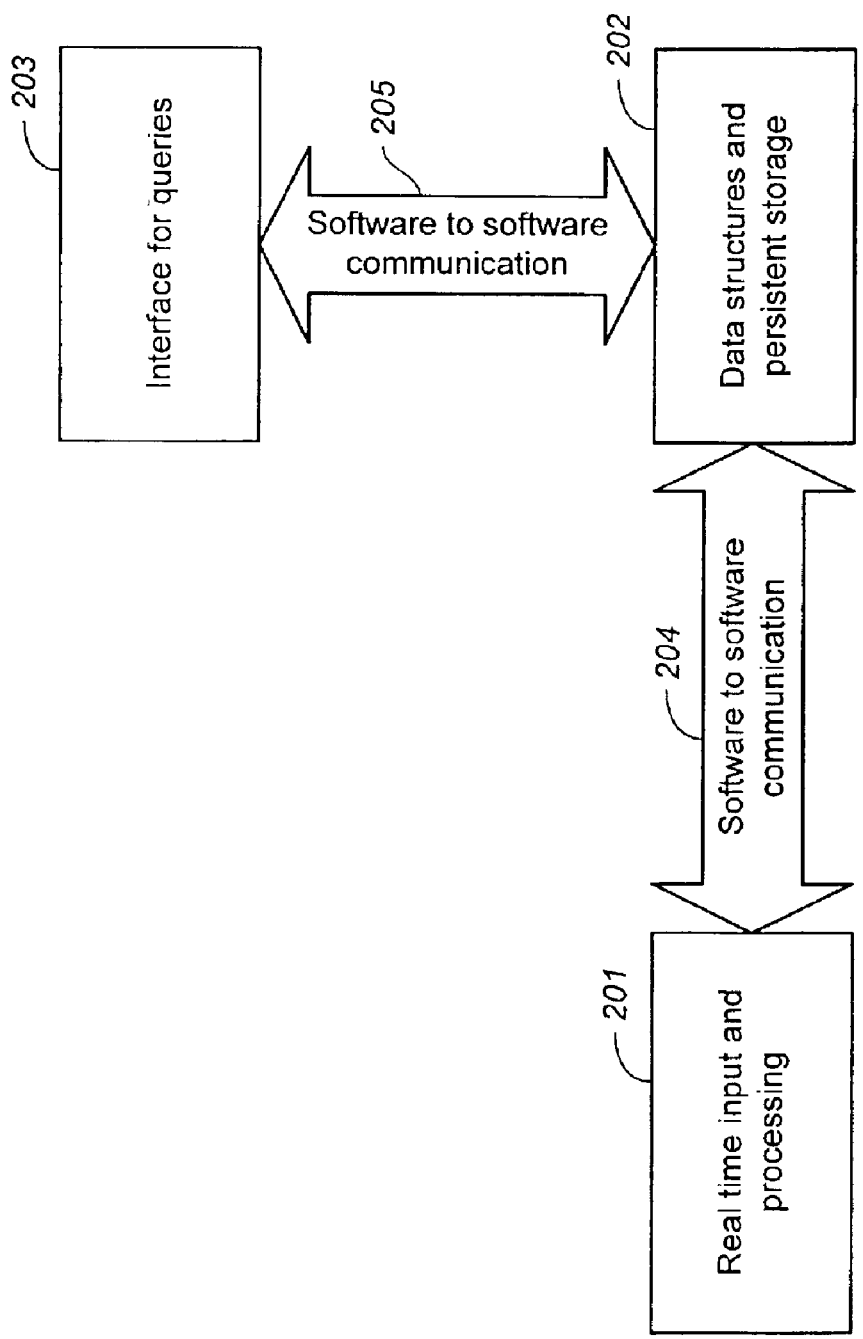
FIG._2

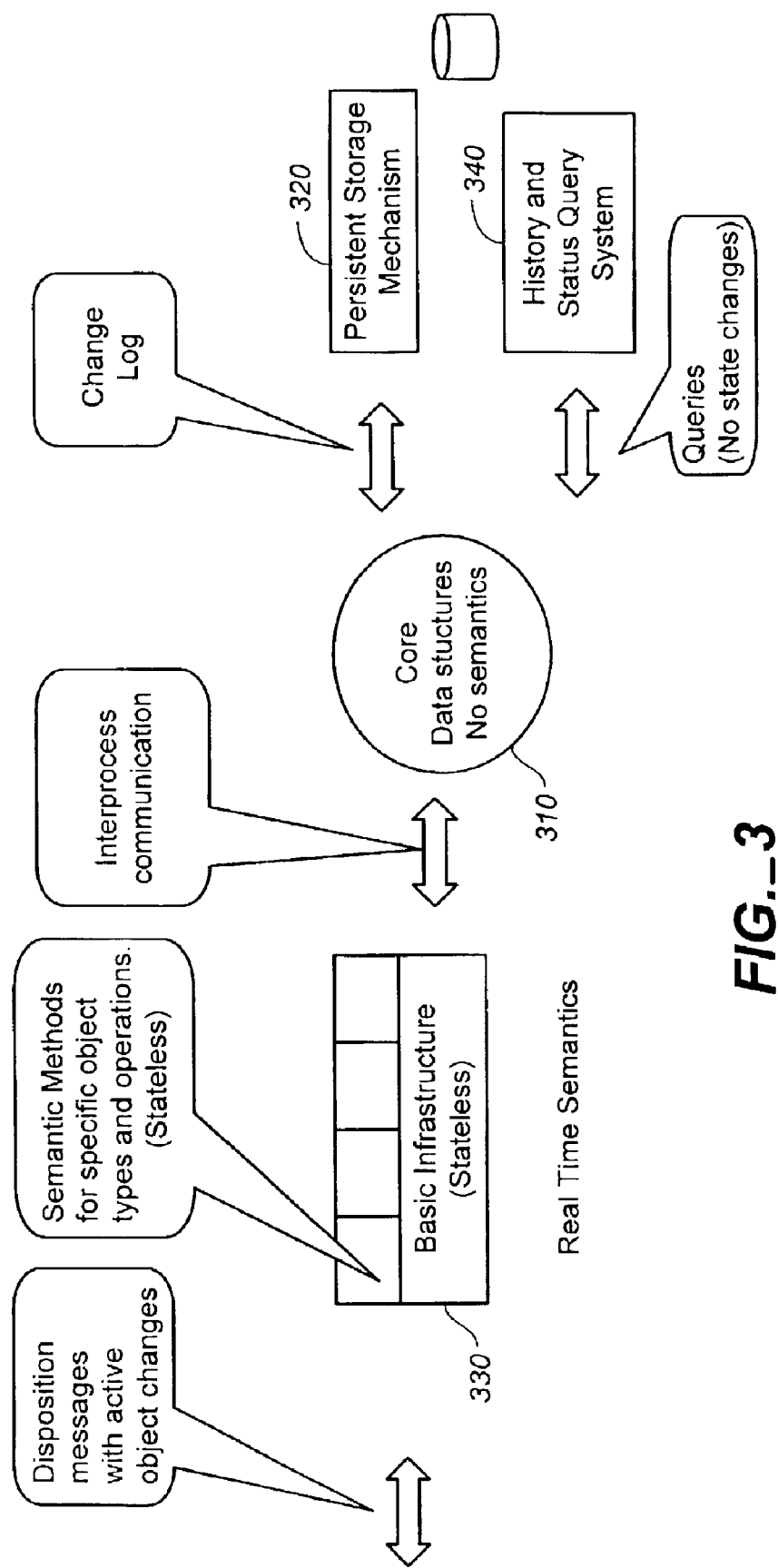
FIG._3

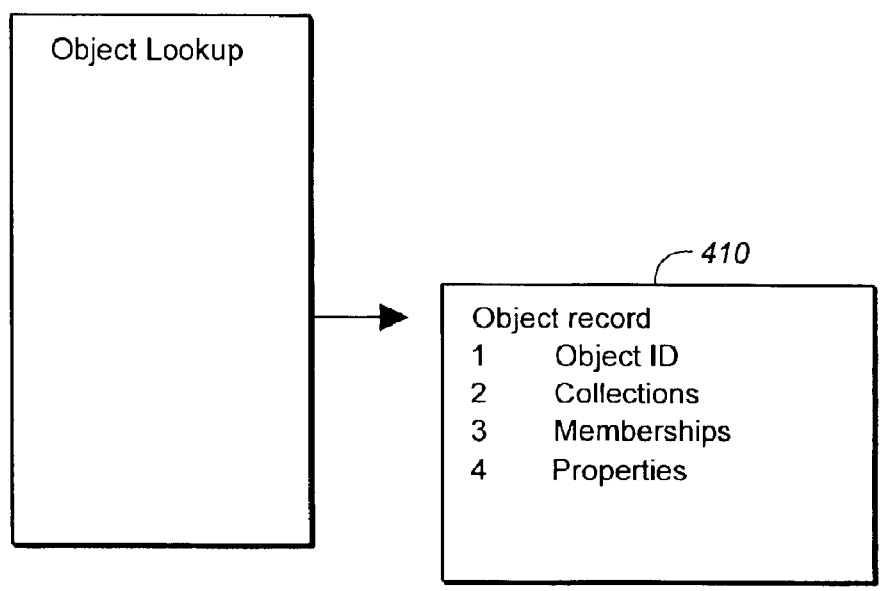
FIG._ 4

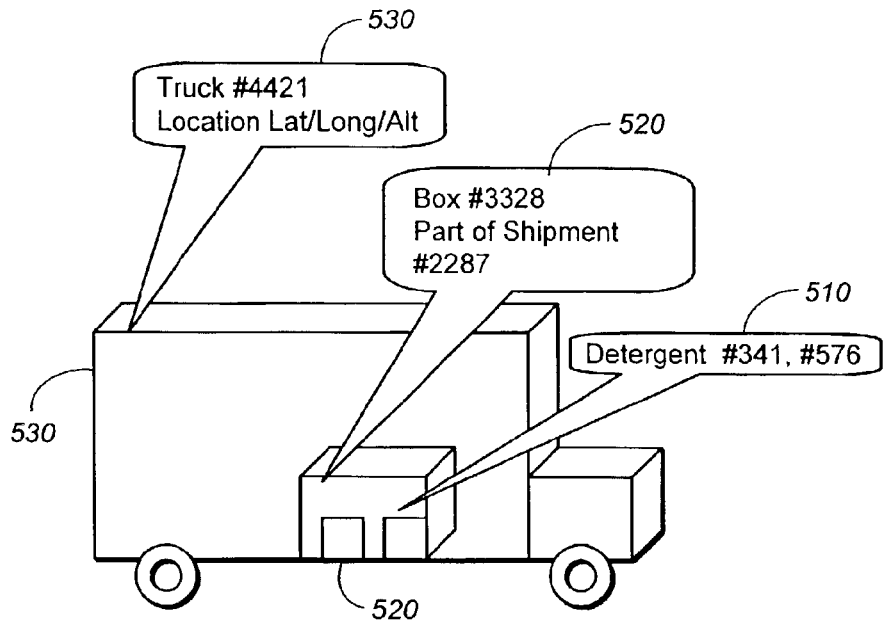
FIG._5A
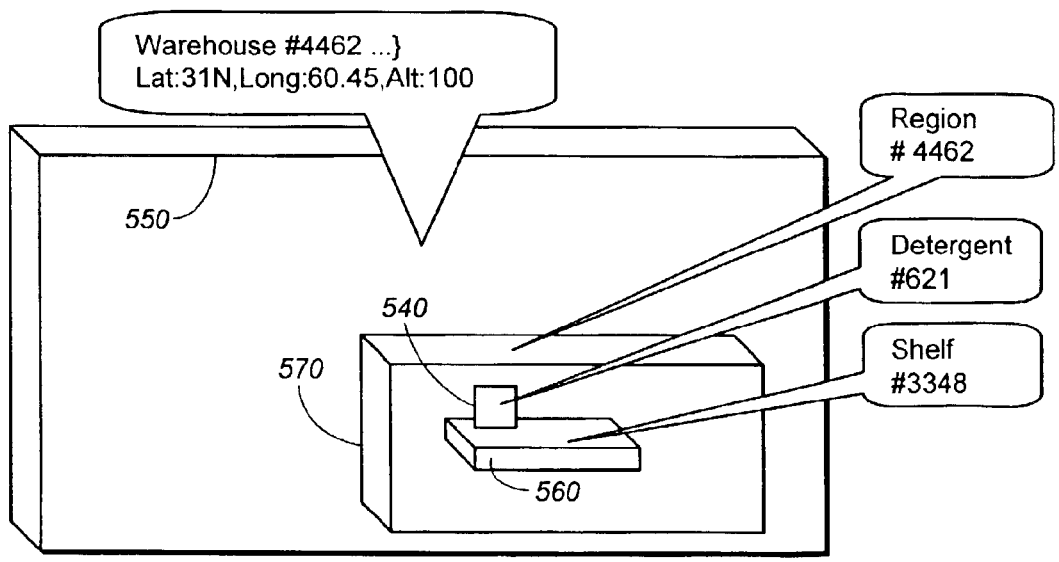
FIG._5B

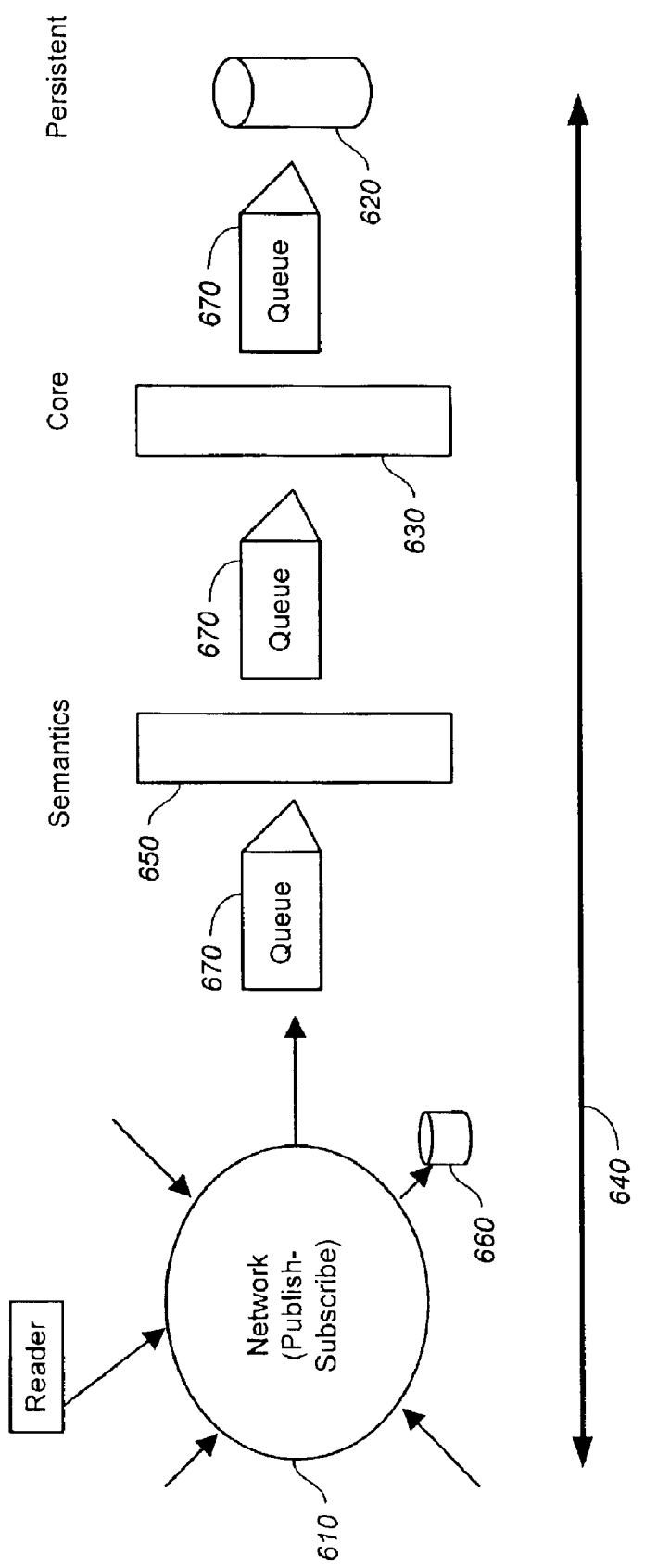
FIG._6

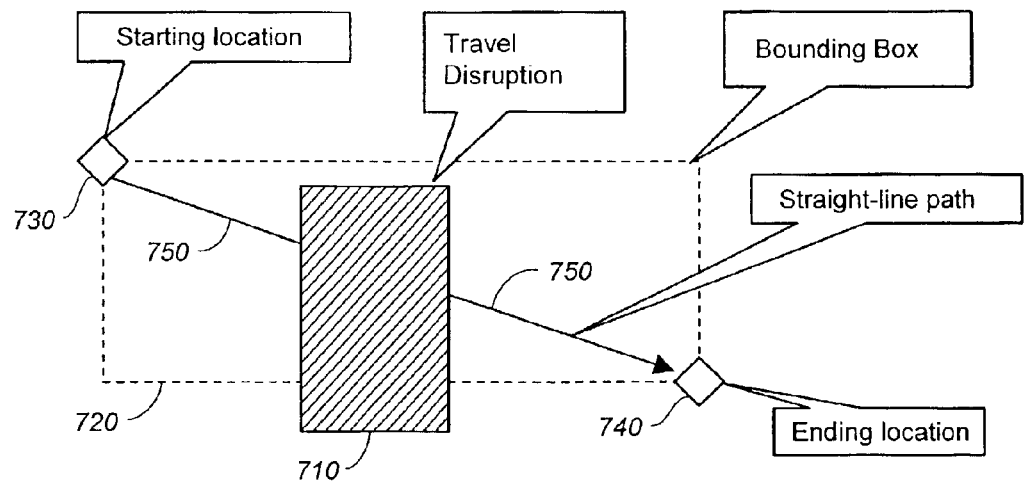
FIG._7
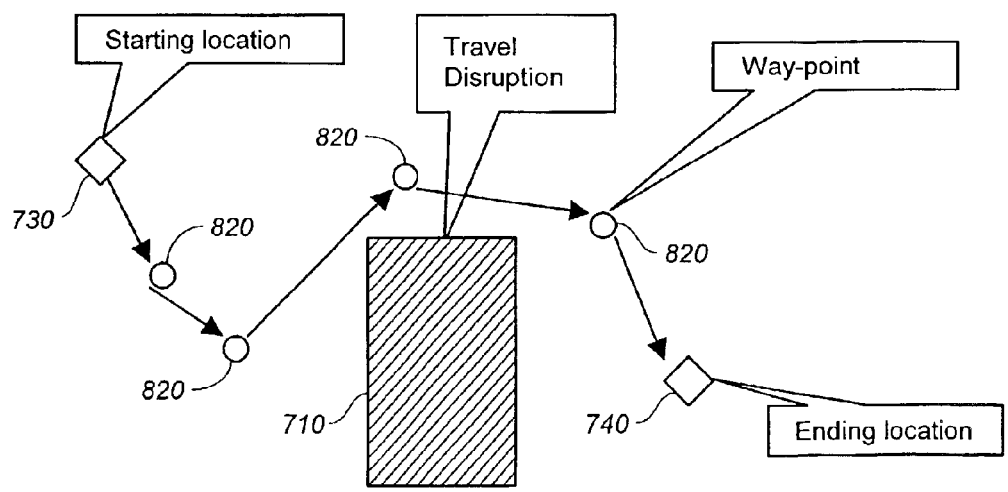
FIG._8

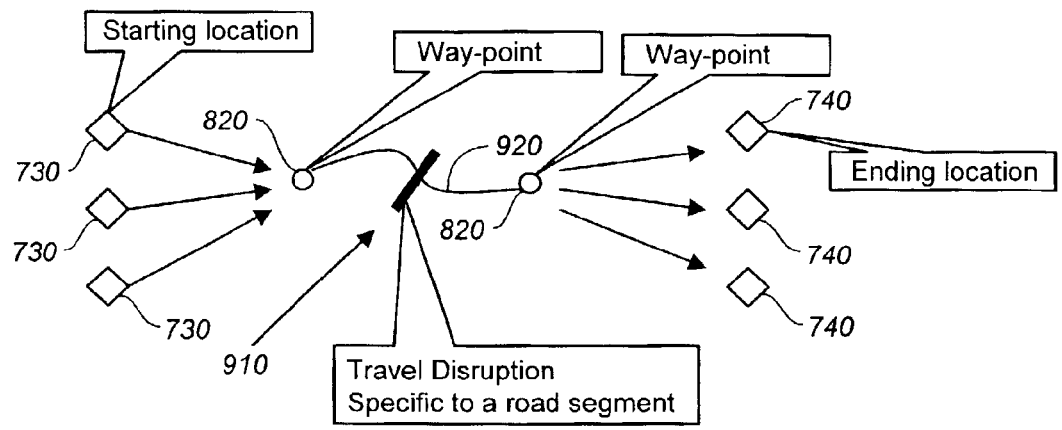
FIG._9
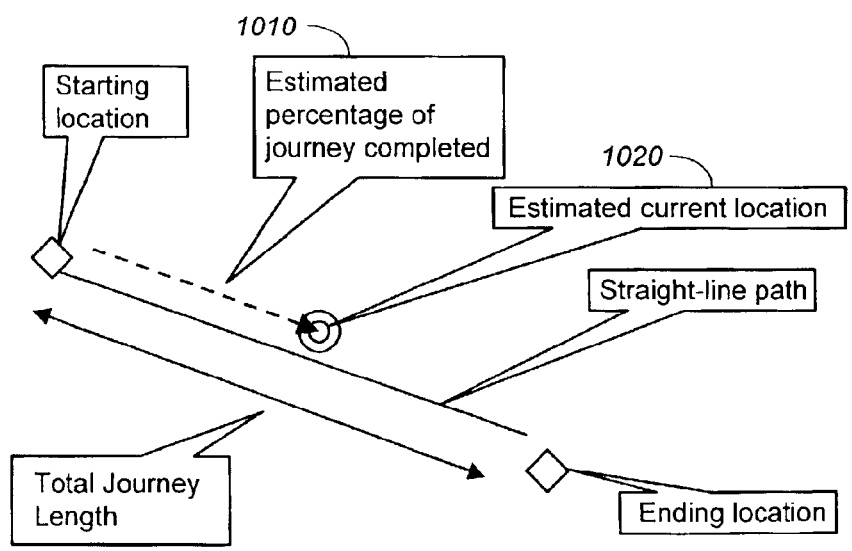
FIG._10

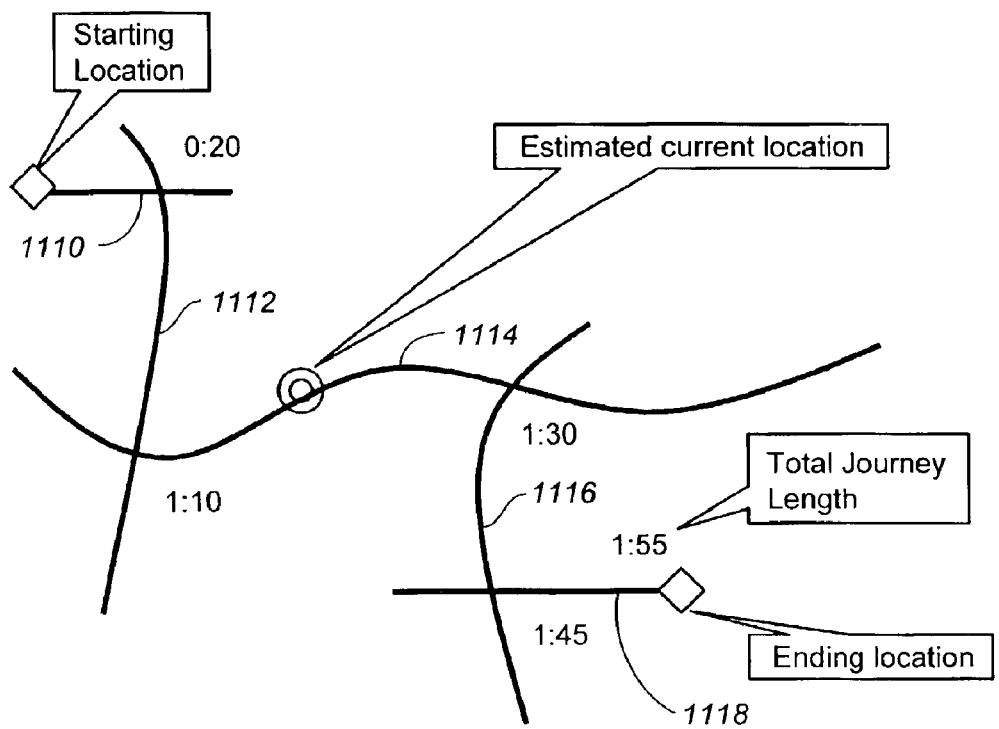
FIG._11

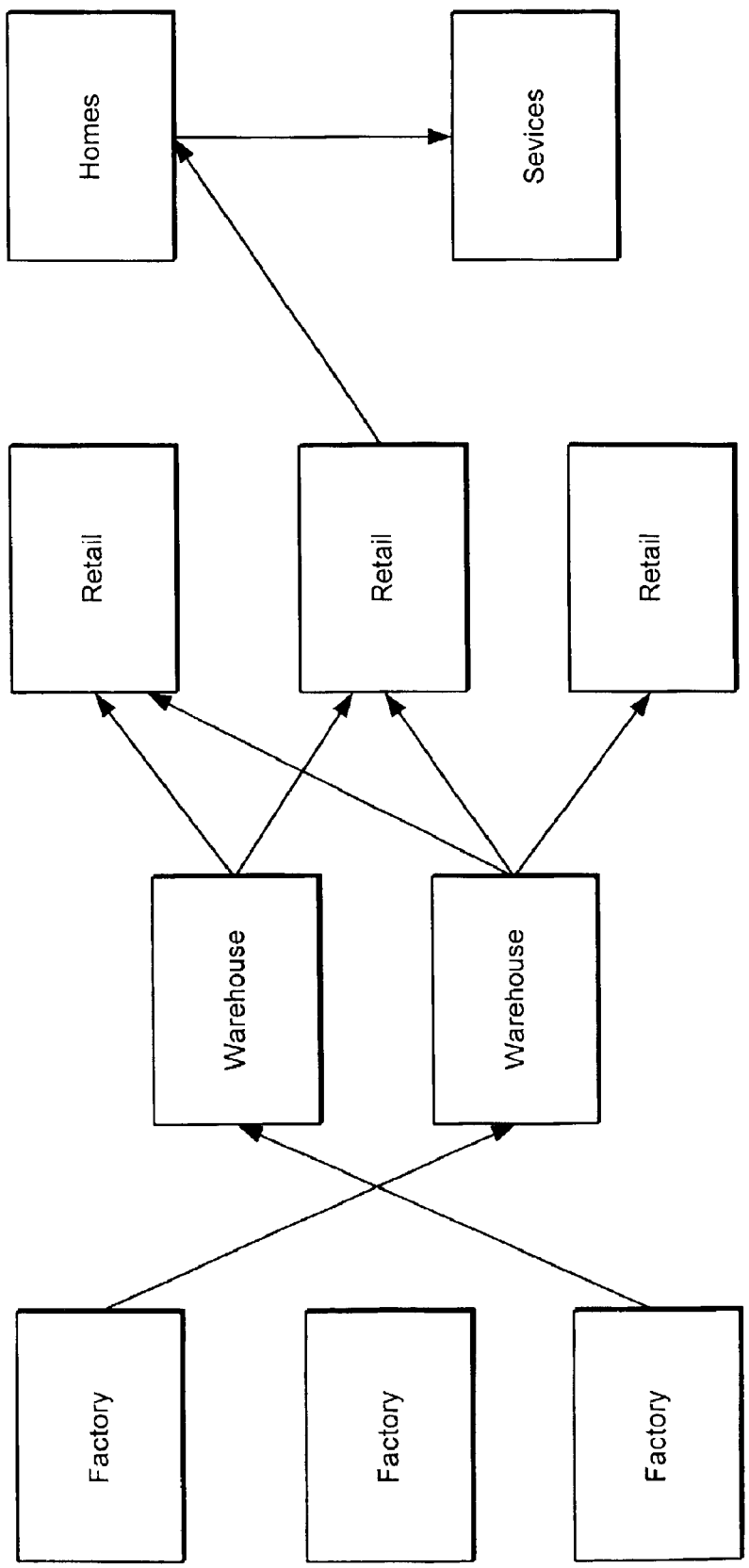
FIG._12

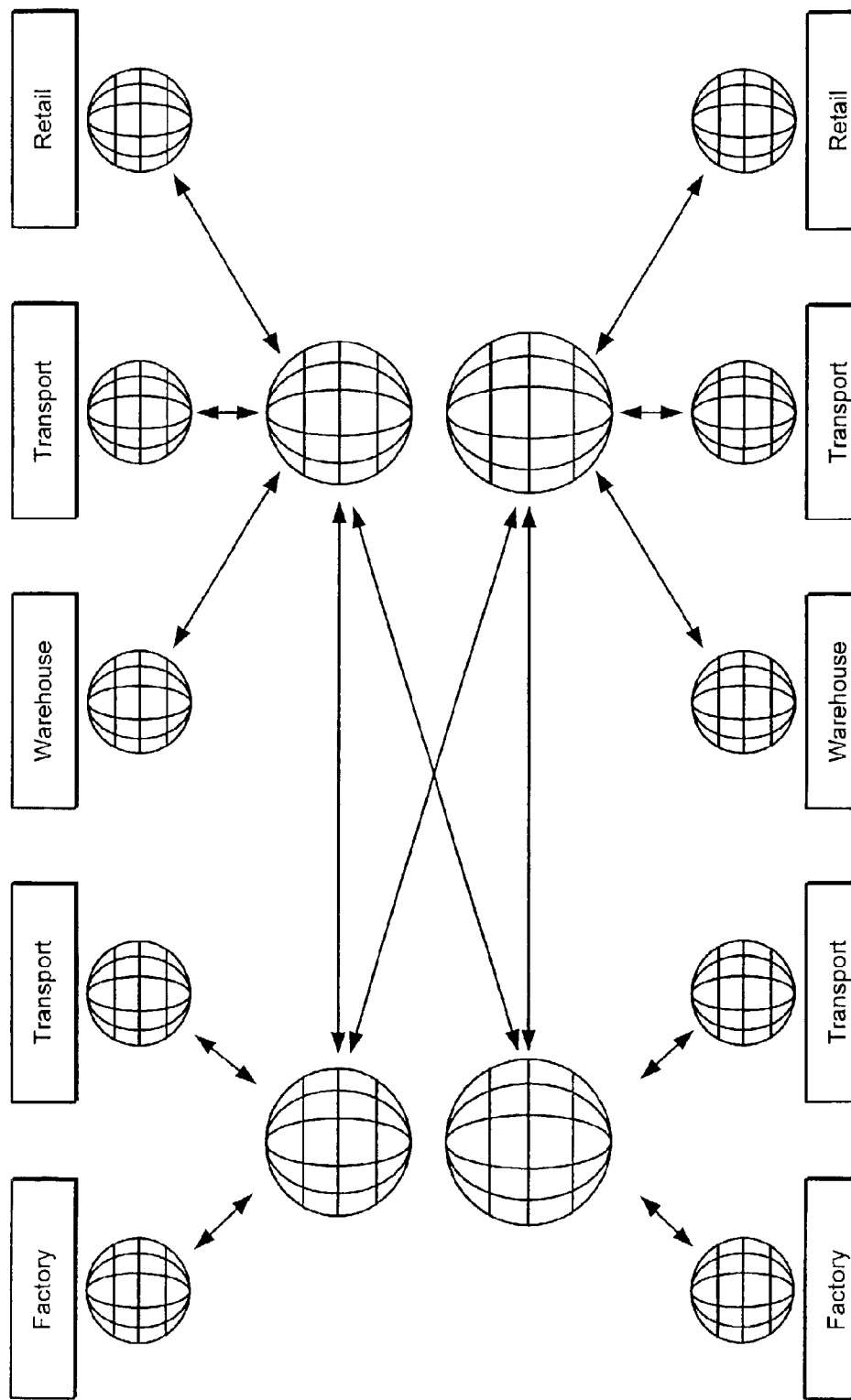
FIG._13

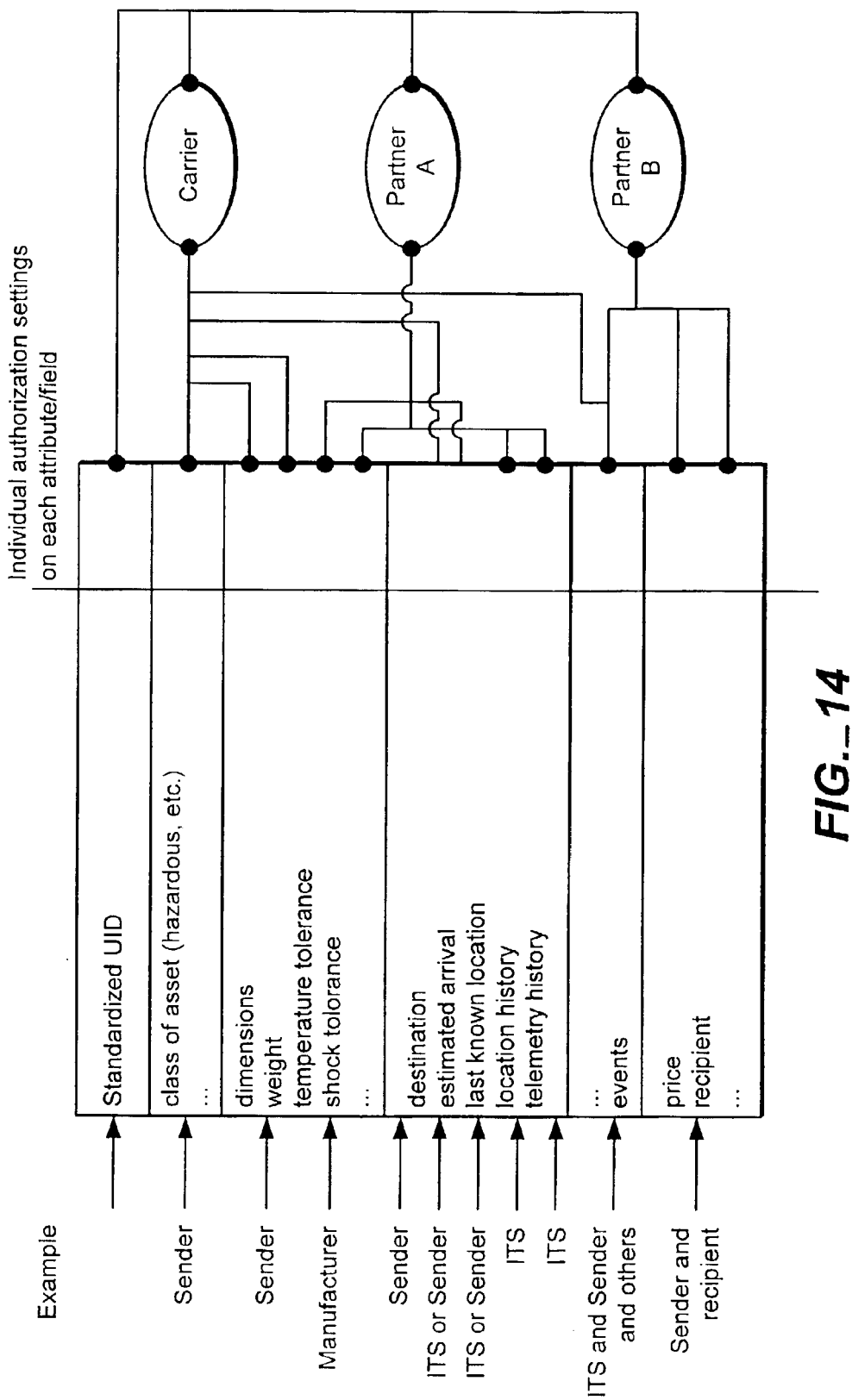
FIG._14

ITEM TRACKING SYSTEM ARCHITECTURES PROVIDING REAL-TIME VISIBILITY TO SUPPLY CHAIN

CROSS-REFERENCE TO RELATED APPLICATIONS

This application claims the benefit of U.S. patent applications No. 60/347,672, filed on Jan. 11, 2002, and No. 60/353,198, filed on Feb. 1, 2002, the disclosures of which are incorporated by this reference.

BACKGROUND

The present invention relates to tracking taggable objects.

A conventional system for tracking tangible objects usually includes computing devices and software. Such systems maintain information that indicates the status, such as a current location, of an object being tracked.

With conventional systems, there can easily be a discrepancy between the actual status of the object and the status as indicated by the system Discrepancies are often caused by flawed manual data input and system limitations. As a result of such problems, conventional systems can have a distorted and fragmented picture of reality. In addition, most conventional systems see with a very limited scope and resolution, for example, systems that can only distinguish between product classes and quantities and not between individual items.

Conventional systems are also not designed to run continuously, 365 days a year, 24 hours a day, and to support a high volume of users.

SUMMARY

In general, in one aspect, the invention features methods and apparatus, including computer program products, for providing multiple enterprises real-time access to information about items in a supply chain. Tags bound to items are read and information read from the tags and location information about the tags is provided by at least two enterprises and used to maintain disposition information about the items, which is made visible to enterprises in the supply chain. The tags can be radio-frequency identification tags having each having an ePC (electronic product code) as unique tag identifier. Visibility of the disposition information can be controlled through authorization. Visible information can include relationships between particular items and business documents such as order and shipping documents. With shipping documents visible, information read from item tags can be used to confirm the identify or completeness of a shipment.

In one aspect, the invention provides methods and apparatus, including computer program products, for providing multiple enterprises real-time access to information about items in a supply chain. Tags bound to items are read and information read from the tags and location information about the tags is provided by at least two enterprises and used to maintain disposition information about the items, which is made visible to enterprises in the supply chain. A system includes means for receiving from a first enterprise multiple instances of tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the first enterprise collectively including information read from tags bound to multiple items; means for using the tag-read-data received from the first enterprise to maintain disposition information for the items; means for receiving from a second enterprise multiple instances of second tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the second enterprise collectively including information read from tags bound to at least one of the multiple items; means for using the tag-read-data received from the second enterprise to maintain disposition information for the items, where tag-read-data received from either enterprise for a particular item is used to update the disposition information; and means for making the disposition information visible to the multiple enterprises in the supply chain, including the first and second enterprises.

Advantageous implementations of the system can include additional features. The system can include means for receiving from a third enterprise multiple instances of third tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the third enterprise collectively including information read from tags bound to at least one of the multiple items; and means for using the tag-read-data received from the third enterprise to maintain disposition information for the items, where tag-read-data received from any enterprise for a particular item is used to update the disposition information. The system can be implemented so that the tags bound to the multiple items include radio frequency identification (RFID) tags, each RFID tag carrying an electronic product code (ePC) as the unique tag identifier. The system can be implemented so that the visibility is controlled visibility; and the system further includes means for receiving authorization information indicating the extent to which the disposition information should be made visible to a particular enterprise within the supply chain; and means for making visible to the particular enterprise only the disposition information which is permitted by the authorization information. The system can be implemented so that the disposition information includes a plurality of item attributes; and the authorization information specifies, for at least one of the item attributes, the enterprises to which the item attribute can be made visible. The system can be implemented so that the multiple enterprises include a source enterprise and a destination enterprise; the source enterprise has an order document for an order placed by the destination enterprise and a shipping document for a physical shipment of goods prepared to satisfy the order placed by the destination enterprise; visibility includes visibility of relationships between the tag-read-data and business documents including the order document and the shipping document; and means for providing the enterprises with real-time visibility of the disposition of items further include means for receiving shipping information including the following: tag identifiers for items corresponding to goods in the shipment; information associating each tag identifier with a shipment number for the shipping document, and information associating the shipment number with an order number for the order document; means for correlating the tag-read-data with the shipping information; and means for making the correlations available to the destination enterprise such that the destination enterprise can use a tag identifier for an item in the shipment to confirm the shipment.

The invention can be implemented to realize one or more of the following advantages. The invention enables early discovery of manual errors made during shipment process such as during the preparation of shipments or the loading of trucks. The invention enables maximum visibility of the actual disposition of goods in a supply chain. The invention enables permanent archival of all history to support reliability, warrantee, customer returns, proof of theft, and other business processes. The invention enables maximum integration with existing systems to avoid duplication of functionality. The invention enables as much automatic functionality as possible that benefits from tags used to track items, for example, by enable billing based on sensing shipment at customer destination.

A system in accordance with the invention can operate continuously, 365 days a year, 24 hours a day. Software upgrades can be performed dynamically without taking the entire system off-line. The data can be stored in a generic structure which does not change even if the semantic structure of the data changes. In the event of failure, low-latency recovery mechanisms enable the system to recover quickly.

A system in accordance with the invention can be scaled to support a high volume of users. The mechanism for making changes to the data can operate out of band from the mechanism for making queries on the data. Queries can be limited to prior states of the data so that the current state is not overburdened by too many queries.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 shows the basic structure of an item tracking infrastructure.

FIG. 2 shows basic software components within the item tracking infrastructure.

FIG. 3 shows mechanisms for storing, changing and querying the tracking information.

FIG. 4 shows property list functionality.

FIG. 5A shows a shipment scenario.

FIG. 5B shows a shipment scenario.

FIG. 6 shows mechanisms for data recovery.

FIG. 7 shows a mechanism for responding to queries.

FIG. 8 shows a mechanism for responding to queries.

FIG. 9 shows a mechanism for responding to queries.

FIG. 10 shows a mechanism for responding to queries.

FIG. 11 shows a mechanism for responding to queries.

FIG. 12 shows a large scale implementation of the infrastructure.

FIG. 13 shows a world model structure.

FIG. 14 shows an authorization model.

DETAILED DESCRIPTION

FIG. 1 shows the basic structure of an item tracking infrastructure implemented with a shared item tracking system (ITS) and multiple local, usually private, item tracking systems. Other item tracking infrastructures will not have an explicit top level, shared node. Some will be federations at the corporate level with no hierarchy above the corporations. Others will have multiple top level, shared nodes, each perhaps supporting a particular industry segment, above the corporate level. In general, the structure will be driven by a variety of considerations, including agreements within the industry supported.

In this specification, the term 'item' has a very broad meaning. It encompasses the meaning of the term 'item' as used in the above referenced patent applications. For compatibility with ERP (enterprise resource planning), SCM (supply chain management), and logistics systems, the notion of an item includes everything normally implied when an item appears on a bill of materials, bill of lading, packing list, pick list, and so on. Thus, it includes any physical object that might have a location, be shipped, be sold to a consumer, and so on. It can also include any asset that is likely to be referenced in a corporate accounting or other business system, such as a shipment.

A tagged item is an item that carries a self-identifying tag. The tag might be associated with a single item (in the sense above) or it might be associated with a collection of items. Thus, to give just a few examples, a tagged item can be any of the following: an individual item, like a bottle of soap; an asset, like a tagged laptop; a case containing a collection of items of possibly various types, or a pallet containing many cases, and so on; a container; a truck or trailer; an airplane; a ship; and a railroad car.

In the consumer goods and other areas, an item may not have any kind of item-specific tag. For example, a tagged case may include 48 bottles of soap, each of which has a bar code with the same UPC (universal product code) or other product number and each of which can be sold to a customer separately. A tracking system can correlate shipments that were tracked at the tag level with point of sale receipts which track individually priced items. Bar codes will not normally carry a UID, just an item type. The system can make some assumptions relating bar code data with tag data. Tagged case-level inventory at a supermarket or retailer can benefit from regular inventories using tag reader. Once a case disappears from inventory, the system assumes that the contents have been put on a retail shelf and may be sold in arbitrary order. If individual items are not identified, there is no way to carry the accuracy of the tracking system beyond the point where the tagged cases are opened.

In FIG. 1, existing ERP (enterprise resource planning) systems 101 can be any local enterprise software that is used for managing the movement and storage of goods. The ERP system for each enterprise (or part of an enterprise) may vary.

Each enterprise has multiple tag readers 102 that feed digital information from digitally identifiable tags into a local ITS. Some implementations optionally have intervening hardware and software between the actual physical readers and the ITS. Readers can be positioned on the manufacturing line, in storage locations, in shipping and receiving areas, at loading docks, within trucks or other moving vehicles, and can also be hand-held wireless-connected devices. Generally a tag reader is any combination of hardware and software capable of feeding digital data collected from any item or container.

Generally, a tag is an RFID (radio frequency identification) tag, but it need not be based on RF technology. For example, a tag can be implemented to be read by optical, magnetic, opto-magnetic, or other technology, either with or without physical contact between the tag and the reader. Moreover, the tag can be passive (containing no internal power source for communications and data transmission) or active; and it can have processing capacity or not. In this specification, a tag should be understood to be a digitally identifiable tag, meaning that the tag has the property that a unique digital identity can be read directly from the tag using some kind of reader. Some digitally identifiable tags can also be written, these offer extra advantages in cases where information needs to be made available without dependence on a communication network.

In FIG. 1, each local ITS 103 is a system of hardware and software that can be implemented on one or more computer systems. This system is typically geographically local to the other parts of the enterprise but physically may be located anywhere provided it has appropriate connections to the local ERP system and the tag readers. Normally, an ITS services a single enterprise or a portion of that enterprise. Thus, when there is more than one local ITS, each can be operated by a different enterprise. An ITS can also connect to other existing enterprise software systems, such as those used for supply chain management, logistics, customer relationship management, and new software services which are enabled by the kind of data available form the ITS.

A shared ITS 104 is an item tracking system that is shared by multiple local ITSs. It connects generally to multiple local ITS systems and can also connect to multiple other shared ITS systems. A shared ITS can also connect to other new and existing enterprise software systems.

Local and shared ITSs communicate over a network connection 105 which can be any computer-to-computer communications technology. Generally, between enterprises, the communication will be encrypted for security, and digital security certificates or other security means will be used to authenticate participants in the communication. The communication medium may include the public Internet. This connection normally passes real-time, or close to real-time, messages representing the disposition of tagged items and other information representing shipping documents, transport vehicles, and so on.

An individual site 106 is the collection of hardware and software needed at an individual site to support local operations. A site can be a manufacturer, a distributor, a retail establishment, a private home, a repair depot, or any other location, or portion of a location, that deals with tagged articles.

New and existing and new applications 107 can be existing enterprise software systems, such as those used for supply chain management, logistics, customer relationship management, as well as new software services that are enabled by the kind of data available form the ITS. Through a network connection 108, these applications can interrogate the ITS about the current state and past history of the items tracked by the ITS and other information. These queries do not change the state as recorded in the ITS system, and so can be handled—with little or no loss of usefulness—by processing a log of the states of the ITS kept in a persistent store, rather than by processing the queries on live data in the ITS.

FIG. 2 shows basic software components within the item tracking infrastructure. A real time input processing software 201 accepts disposition and other messages from tag readers, existing ERP systems, and other ITS systems. These messages can be in XML or other format. The messages can represent creation of physical or logical items, or changes in the disposition or status of these items. This part of the software interprets the incoming messages, consults the data storage element 202, undertakes the appropriate action based on the message content and the stored data, updates the data structures as specified and potentially returns error messages or other reports to the source of the message.

The elements of the data structure representing the state of the items being tracked will be referred to in this specification as objects. Thus, the term 'object'—in reference to data—will be used to refer to data that corresponds to and is used as a representation of any item. In any particular implementation, an object can be implemented as an object in the object-oriented programming sense of the term; however, it can also be implemented in any other convenient way, for example, by a record in a database.

Data structures and persistent storage 202 records and maintains a representation of the relationships, state and history of logical and physical items tracked by the ITS. For example this software may record that a certain unique tag corresponds to a specific bottle of detergent. The detergent may be physically contained within a box (another unique tag and item known within the ITS), which may be on a truck (another unique tag and item within the ITS) and the location of the truck item may be periodically updated in response to real-time messages and software action from real time input processing software 201. The data structures may also record that the detergent is part of a certain shipment (a logical item with a unique ID). The data structures and persistent storage preserve the data structures over any hardware of software failures. Any robust method of building persistent storage can be used; for example, one can use software database technology and magnetic disk drives to record information in a non-volatile manner.

A software interface 203 for queries provides the interface between an ITS and outside enterprise software applications. For example, if a conventional ERP (Enterprise Resource Planning) or SCM (Supply Chain Management) system requires an update on the current actual locations of certain items, it would send a query. The ITS persistent storage can provide the information necessary to handle, and the interface for queries can use this information to handle, queries like: "Report all batteries of a specific type (identified by a product code) that are currently within a given geographical region." Or a query like: "Report all milk cartons that are within 48 hours of exceeding their shelf life."

System Requirements and Functionality

The core 310 of the ITS infrastructure (shown in FIG. 3) should operate continuously, 365 days a year, 24 hours a day. It is impractical to take the system down for maintenance or system upgrade when substantial economic activity depends on some part of the system. However, the system will need to be upgraded in various ways. The architecture that will be described addresses this need.

Three classes of software upgrade will be considered: adding or deleting fields (i.e., properties), adding or changing code (i.e., computer program instructions) that takes semantic notice of field contents, and major system upgrades. Each is discussed here in turn.

Manufacturers, distributors, retailers and others may need to add or delete data fields to representations of individual items or groups of items for the convenience of local operations. For example, it may be desirable to add a field that indicates the temperature at which the item was processed. This information might be important, for example, for long term reliability and return studies. This processing temperature field contains different information than existing temperature fields, such as the current temperature or maximum temperature sensed during transportation or storage of the device. It may be treated differently, as well. For example, the manufacturer may want the processing temperature value stored long term, for the reliability study, but not revealed to other manufacturers, and perhaps not to any other organization.

Other examples of adding or deleting data fields include: A retailer wants to record items purchased and then later returned. A regulation changes and some jurisdictions require a sell-by date on this class of product; the field is completed by the manufacturer and acted upon by the distributors and the retailer.

In another example, a distributor is responsible for providing return-freight for items that are to be returned to the manufacturer by the consumer. The distributor wants to add a field "Return-Freight-Responsible-Party" that will be filled automatically with the name of the distributor, so that the legally responsible party is charged when the item is returned. Such distributor information may or may not be available from history. Nonetheless, the additional field makes it explicit who is responsible for this charge without doing a query to history.

In general, the system is able to add a new data field (i.e., property) dynamically to any existing object. Moreover, the object record is accepted by any higher or lower hierarchical system with no programming changes and no need to change prior or future objects of the same type.

Deletions may be desirable for data fields that are meaningful only when the object is in a certain state. For example, fields associated with a shipment list or packing list are only valid when the object represents an item that is part of a current shipment. Once the shipment is officially received, shipment information fields are deleted from the active data structure (but retained in history). Alternatively, if invalid fields are not deleted, they are marked invalid.

Adding or changing code that implements semantic behavior allows the system to be upgraded. It is generally desirable to add new capability to the system continuously and revise older functionality. Such changes require many decisions, such as: where the new capability is added, who does the programming, how it is tested, and how impact on other activity is minimized.

Examples of situation requiring additions or changes to semantic behavior include: A new member joins a consortium and needs new functionality for handling its kinds of goods. Existing functionality changes; for example, a method of handling the setting of a sell-by date changes, or a better procedure for loading a truck is developed.

Adding functionality to any element of the infrastructure may require the addition of new data fields.

Changes to semantic behavior have the potential to crash the total system. Thus it is vital to have very controlled ways of testing and introducing new code that changes semantic behaviors. In general, one can change the semantic processing of a specific item type and specific items without halting the operational system. Moreover, there is a high-level of assurance that the behavior for other objects will be unchanged.

Major system upgrades are possible, including upgrades to change all the software, upgrade disk formats and upgrade hardware. In general, the system is able to transparently switch central system operation from one hardware/software configuration to another without any loss of service being visible. This procedure should be rare.

For system reliability reasons, a shadow system can be run. Such a system also provides a mechanism for major system upgrades.

As shown in FIG. 3, active data storage is separated from all semantic methods. The core 310 provide a small set of basic functionality but are otherwise independent of any object-specific processing. Consequently, the core 310 does not need to change when new data fields or new semantic processing is added. Such a core is very general and can be optimized for its basic functionality and for very high reliability. The core 310 programming will rarely change.

Other parts of the system communicate through interprocess communication or document exchange, so that the core 310 can continue to operate even if other components fail and must be restarted.

The core 310 can be restarted from a prior snapshot. It can then be made current either by replaying prior events (assuming idempotency) or by using what is available from persistent storage to reconstruct the current state. As discussed below, changes that have not been committed to persistent storage 320 must be re-executed.

The small set of functions that will support all the diverse needs of the system in an efficient manner are described below.

In FIG. 3, The stateless real time semantics section 330 performs the following actions: (1) It accepts disposition messages from the network. A disposition message always specifies at least one item. (2) It retrieves the object(s) corresponding to the specified item. Locking can generally be avoided. (3) It can use information from the object to select the appropriate semantic processing method. (4) It retrieves any further objects needed and, if necessary, locks them. (5) It computes the updated object record. (6) It passes the changes to the core 310, and may unlock all object records.

The real time semantics section 330 is entirely stateless. Thus, it is possible to shut down any portion of it at any time, restart, and have operations continue. This greatly facilitates dynamically loading new semantics methods, for example, using Java mechanisms, and recovering from any failure.

There are several ways to choose the method applied to an incoming disposition message. The appropriate code depends on both the type or class of the object and the disposition indicated. For example, loading a transport vehicle will probably be very similar for most objects, but the "sold to end-user" disposition may be highly dependent on the item type. At least two alternative implementations are available. (1) Rely on the explicit product-type field used in the ePC proposed by the MIT Auto-ID center. (2) Look up the designated object, and possibly its root-type object, to gain an item type identifier.

The second approach does not depend on the ePC numbering scheme be deployed, and will work with any tag system. Furthermore, its level of indirection allows broad classes of objects to be processed by the same software. For example, all detergent products of one manufacturer may be processed with the same code, while those of another could have different code. Finally, it is possible to set up the core 310 so that individual items can be flagged to trigger different code. Doing so permits live testing of new code that is limited to a small set of objects. To achieve high performance, this code is multi-threaded. This enables the object (and possibly any root object referenced by the object) to be fetched before the semantic code is dispatched.

The core 310 can be advantageously implemented so that it does not provide persistence. To provide flexibility and speed, the core 310 can be a computer memory subsystem. Alternatively, the core 310 can be mapped directly to the persistent storage mechanism 320.

The persistent storage mechanism 320 is a module that takes a stream of object change notifications from the core 310 and commits them to persistent storage. It is possible to build a current snapshot of the system state quickly from the stored information.

The history mechanism 340 is provided as follows. There are two sources of activity for the system: disposition messages, which typically represent the beep or signal from an individual item, and queries against the accumulated object movement data by external systems. The object movement beeps update the core 310 since they represent changes to the state of the universe of items, but no access to prior history is needed. The external queries are concerned with movement history and current disposition but do not need to change the state.

The system can accumulate the history and also has a recent view of the current state, so it can be optimized for large non-real time search intensive queries. Because it is essentially read-only, it can be easily duplicated to support high volumes of queries.

The history mechanism also needs persistent storage. The history functions therefore are typically subsumed into the persistent storage mechanism 320.

The core 310 has a minimal set of functionality. It is able to create and extend objects, including functions to:

(a) create an object, and
(b) add or delete a property name-value pair.

All object names are unique and of arbitrary size. A name is taken from an extensible name list, to prevent proliferation and avoid creation of conflicting names with inconsistent semantics.

The core 310 can access and change property values. In particular, it can:

(a) return all properties (name-value pairs), and
(b) update property name-value pairs.

The core 310 has specialized (built-in) property list 410 functionality, such as named collection ownership and membership, including:

(a) the ability to make object owner (root) of a new type-name collection, and
(b) the ability to add and delete members of a named collection.

Finally, the core 310 has object locking, which is very rarely used, including the ability to:

(a) lock object—provide signature, and
(b) unlock object—provide matching signature.

This very small set of core 310 functionality has little to do with tags and readers or with item locations in the real world. This is a primary virtue. The data structures are sufficiently general that they will not need to change with the semantics of the items passing through the supply chain and other applications. The core 310 software is highly optimized to perform a small set of operations, while semantic changes are accommodated in the stateless semantic methods. Of course, many conventions may be locked into the data structures as they grow, and certain semantic changes may require current object structures to be re-constructed. However, this can be done on a live system and without software changes to the core 310.

The following table provides a simplified example of how these structures can be used.

```
#1147: {ObjectID: #1147} {Obj_Type:Base_EPC_Type} {Software_Version: 2}
   {Class:"Detergent"} {PML:"http: . . . "}
   {EPC_Type_Collection_Root: #341,#576 . . . }
   #341: {ObjectID: #341} {ObjType:EPC_Object_Instance}
{EPC_Type_Collection_Member:#1147} {Container_Collection_Member: #3328}
   #576: {ObjectID: #576} {ObjType:EPC_Object_Instance}
{EPC_Type_Collection_Member:#1147} {Container_Collection_Member: #3328}
   #621: {ObjectID: #621} {ObjType:EPC_Object_Instance}
{EPC_Type_Collection_Member:#1147} {Container_Collection_Member: #3348}
   #2287: {ObjectID: #2287} {ObjType:ERP_Shipment}
{Shipment_Collection_Root:#3328 . . . }
      {Shipment_Enterprise_Member: #3347}
      {Shipment_System_Source: "R/3_4.6"}
      #3328: {ObjectID: #3328} {ObjType:Container}
      {Container_Description: "14 x 18 x 10 Cardboard Box"}
      {Immediate_Location_Type: Follow_higher_level_container}
      {Container_Collection_Root: #341, #576}
      {Shipment_Collection_Member: #2287}
      {Container_Collection_Member: #4421}
      #4421: {ObjectID: #4421} {ObjType:Container}
      {Container_Description: "10,000 lb Truck"}
      {Immediate_Location_Type: GPS Long-Lat-Alt}
      {Container_Collection_Root: #3328}
      {Latitude: 32N} {Longitude: 60.45} {Altitude: 327 M} {Location_Last_Update:
Jan. 12, 2002 14:27}
      #3348: {ObjectID: #3348} {ObjType:Container}
      {Container_Description: "Warehouse Shelf"}
      {Immediate_Location_Type: Fixed Storage Location}
      {Storage_Location_LOcal: "Shelf 3"
      {Container_Collection_Root: #621 . . . }
      {Container_Collection_Member: #4462}
      #4462: {ObjectID: #4462 } {ObjType:Container}
      {Container_Description: "Warehouse Region"}
      {Immediate_Location_Type: Fixed Storage Location}
      {Storage_Location_Local: "Region 16"
      {Container_Collection_Root: #3348 . . . }
      {Container_Collection_Member: #4481 . . . }
      #4481: {ObjectID: #4481} {ObjType:Container}
      {Container_Description: "Warehouse"}
      {Immediate_Location_Type: Top Level Fixed Location with Lat/Long/Alt}
      {Container_Collection_Root: #4462 . . . }
      {Latitude: 31N} {Longitude: 60.45} {Altitude: 100 M}
```

The above table describes a fairly complex situation, also illustrated in FIGS. 5A and 5B: As shown in the table, #1147refers to the product class "detergent". Specific bottles of detergent are represented by object instances #341, #576, and #621.

As shown in FIG. 5A, two of these detergent bottles 510 are inside a cardboard box 520. The box is on a truck 530 and the truck has a GPS location system for real time location reporting. The box is part of a specific shipment. There is a third bottle of detergent 540, which is stored in a shelf 560 in a region 570 of a warehouse 550.

The collection mechanism gives the data structure a great deal of power. For example:

Given the ObjectID of the Detergent EPC base type (#1147) one can interrogate the collection, and get to all the instances of Detergent and their current locations.

Given the ObjectID of the warehouse, one can find all the items in the warehouse and their stocking locations.

Given the ObjectID of any instance of the detergent, one can find the corresponding shipment number, if there is one.

Given the ObjectID of a Shipment, one can find all the items and their locations.

Given the ObjectID of the Truck, one can find all the items in the truck and their associated Shipment documents.

Data Recovery

Data recovery is a key issue. FIG. 6 illustrates the latency in the system from the time when a beep is detected at the leaves of the network 610, until the implications of that beep are recorded to persistent storage 620. Assuming a catastrophic failure at a shared (central) site 630, recovery implies starting with the information which is currently on disk and then taking into account all the changes which have not been processed.

One approach to recovery is to record a certain amount of history within the network infrastructure itself 660. For example, publish-subscribe distribution mechanisms can be built to have reliable internal persistent data storage. Another approach is to have persistent storage at each leaf node of the network.

The total storage needed 640 is equal to the total latency through the system from the tag readers to the system persistent storage.

In general it is not easy to be certain which events were acted upon and which were lost. Furthermore, there is no inherent ordering of the processing of events through the real time semantics section 330 and the core 310. Replaying sufficient events to cover the largest possible loss works, provided all processing is idempotent and order independent. If this condition is met, the semantics of the operations invoked 660 are such that if events are processed in different orders or if the same event is processed more than once, the ultimate system state will be identical.

Location Updates

Some high valued items and also transport vehicles, such as trucks, can be tagged with Real Time Location Systems (RTLS) that provide for periodic updates of location. For example, WhereNet Corporation of Santa Clara, Calif., offers WhereTag tags that periodically broadcast their identity to a local area in the 2.4 GHz band and the location is determined by triangulation. These tags broadcast at fixed intervals, from seconds to minutes, that can only be changed by physical access to the tag.

In addition, wide area systems can use GPS (global positioning satellite) receivers in association with a conventional communication system, such as a cell phone or a low-bandwidth satellite uplink system, to provide periodic location updates. The communication systems may be polled for the current location from a base station or they may call in at intervals that can be remotely programmed.

A basic capability of a tracking system is to receive reports of location information. While it would be convenient to have a single method of reporting location, use of latitude and longitude within a narrow area such as a building or a warehouse risks requiring many extra calculation steps that are unnecessary, and so an offset from a local frame of reference would generally be used. For wide area usage, the latitude, longitude, and altitude available data from a GPS system are appropriate.

Batch Identification

In general, the item tracking system will be provided more information than just the beep that an item was seen at a certain reader. Such information might be the planned disposition of an upcoming batch of items being read. For example, "the following items are being taken out of stock and are being packaged for shipment x". Elsewhere, the system will be provided information about this shipment.

Such information can come from a terminal close to a tag reader that connects directly to a system application (e.g., a Web browser based application) or indirectly from a local system that can transmit an appropriate message to the tracking system.

Because items often come in batches, beeps can be cached locally until the end of the batch is recorded. The reader or local system then sends the tracking system a message that includes information about all the items in the batch. The message may be formatted in a markup language such as XML.

Each batch can be given a unique ID. A batch number (batch-ID) is a way of concisely communicating common information about a group of items. Each reader may have a default batch-ID, which is used if no batch-ID is specified. If batch-IDs are used, the message from the reader may be of the form:

Timestamp, Batch-ID (e.g., 96 bit ePC), Item-ID.

Such use of batches can support a sorting function, for use when items are not batched before they are read. For example, an assembly line may have a sequence of items and a series of bins. The reader reads the tag on each item, and decides, for example, whether to put the item in bin 1, 2 or 3. Each bin may indicate, for example, a different disposition. The reader associates a different batch-ID with each bin, and each item is associated with the batch-ID of the bin into which it is placed.

The primitives for batch designation can include the reader, which has a unique ID, and the shipment, which also has a unique ID. The reader is associated with the shipment to produce a particular batch, which has a unique ID. Multiple batches, from the same or different readers, may be associated with the same shipment. The necessary primitives for shipment may include a unique ID, a local shipment number (e.g., the number used in a local ERP), a destination of goods, a target delivery date, and a target delivery time.

The association of each item with a batch rather than with a reader allows information to be repeated safely and without confusion. For example, if disposition messages are retransmitted, due for example to a system failure and restart, the state of the system will not change if batch-item pairings are used rather than reader-item pairings.

Disposition Action

A disposition action describes a state change for the hierarchy of objects and items related to or associated with a tagged item. Disposition actions include, for example: creation of item or first introduction of an item to tracking, location change, inventory check, shipment, loading, unloading, and end of tracking.

The disposition action "creation of item" records the initial properties of an item, such as manufacturer, type, birth date and location, and so on. This action may include initializing the tag with certain data provided. It generally includes an indication of an initial stocking location for the item.

The disposition action "location change" indicates that the item will be or already has been moved to a new given location. "Inventory check" indicates that the item is recorded as being sensed at a stocking location.

The disposition action "shipment" indicates that the item is designated as part of a certain shipment. The shipment number that is known to the local ERP system may be given.

The disposition action "loading" indicates that the item is sensed while loading a certain transport vehicle. The truck or other transport ID may be tied to a shipment ID.

The disposition action "unloading" indicates that the item is sensed while unloading a certain vehicle. The vehicle ID may be tied to the shipment ID.

The disposition action "reversal" is an action that effectively cancels any prior disposition for the same item and same batch. It is often needed to reverse a prior disposition. For example, a reversal may occur when too many items are loaded. This action is not idempotent.

The disposition action "end of tracking" indicates that the item is not expected to be seen again by the tracking system. This action may occur, for example, at retail sale or when a package of items is opened and the case is recycled. The system may archive item data for later warranty or history purposes.

There are many other possible dispositions. A flexible designation of dispositions is preferred.

Shipment

A shipment identifies a packing list, typically of the form: Item-Type Quantity list. A shipment also defines a planned movement of these item-types to a destination. The destination may be a customer, with a street address, or another location for the same company. The tracking system determines location, e.g., latitude and longitude, from the street address, or receives this information as part of the shipment description.

The shipment is known to the local ERP system. The tracking system can retrieve the shipment information, match specific items to the generic item-types in the shipment list, and report discrepancies.

One or more planned shipments may be associated with a particular transport vehicle. For example, several different shipments, some going to the same address and some going to different addresses, may be loaded onto the same truck. The system can verify that the truck was correctly loaded. Also, the system can track the truck or estimate its location, and respond to queries about the location of the goods.

A particular logical shipment may, in actuality, be spread over several transport vehicles. This division can occur at a level above the system. In this situation, the system tracks the physical shipments rather than the logical shipment.

The system can identify the transport vehicle and indicate how to communicate with it. The system can thus respond to questions such as: "Tell me the driver's name and mobile phone number for my contaminated meat shipment heading for San Francisco."

Transport-Route

The 'transport route' information is information about the expected geographical path of a transport vehicle, such as a ship or truck. It can be a series of way-points, such as cities or highway intersections, individual highway or street names, latitudes and longitudes, and so on. The transport route may be provided explicitly. For example, it may be entered manually. Alternatively, it may be calculated or otherwise inferred, as described later. A transport route applies directly to a transport vehicle, and only indirectly to a specific shipment.

Disposition Message

A disposition message indicates that a certain item was sensed at a stated time and was part of a batch intended for a specific deposition, for example, movement to another stocking location, shipment to a customer, and so on. A disposition message may be of the form:

Timestamp, Batch-ID, Item-ID.

This concise message ties together an item, a reader, and a shipment number that is known to the local ERP system. Repeated transmissions of the same disposition message has the highly advantageous property that it will not change the state of the tracking system.

Tag Memory

The described objectives and functionalities of the system concern only the tracking of tagged items. However, particular applications may require writing data to an item tag at some stage where the tag is sensed. The system can write and read such tag data at any site.

The system can provide large scale event reporting. For example, the system can report to other applications when particular milestone events occur. It can, for example, send a message when a shipment reaches a customer, and thereby trigger billing.

Enabling Cross-Enterprise Visibility

The system can enable cross-enterprise visibility of items in a supply chain. The system can receive, store, and make visible disposition information for the items, such as the location of the items as the items move within a single enterprise or across multiple enterprises. Additionally, the system can receive, store, and make visible correlation information that relates the items to customer orders, shipment documents, and other business transactions. The system can receive the correlation or disposition information from any participant or enterprise in the supply chain and can make the information visible to other participants or enterprises in the supply chain.

As shown in FIG. 12, the system can track items and provide access to the tracking information on a very large scale. For example, the infrastructure can track items that are located in many diverse settings, including factories, warehouses, retail outlets, and homes across the country or the world.

Controlling Visibility

In one implementation, the system can provide controlled visibility. In other words, only a subset of the item tracking information is made visible to a particular participant in the supply chain. As shown in FIG. 14, the system can receive authorization information that specifies authorization settings for various attributes of the item. The system can use the authorization information to determine which attributes to make visible to which enterprises. For example, the authorization model shown in FIG. 14 specifies that the destination attribute of the item should be made visible to the sender, but should not be made visible to the manufacturer. Controlling visibility is discussed in more detail in U.S. patent application Ser. No. 10/136,861, the disclosure of which is incorporated by this reference.

World Model Structure

FIG. 13 shows a world model (WM) structure shared by multiple enterprises. The world model is a structure that records and maintains a representation of the relationships, state, and history of the items being tracked by an ITS. The world model can be implemented as a two-tier structure: A higher tier parent WM that keeps track of items located within a particular enterprise and a lower tier local WM that keeps track of the items located at a physical site within the particular enterprise. The local WM can be contained within a local ITS 103 (as shown in FIG. 1) and the parent WM can be contained within a shared ITS 104. Through a network connection 105, a parent WM for one enterprise can communicate with the parent WM of another enterprise.

Item Scenarios

The following paragraphs describe item scenarios.

When an item is created, the following scenario can take place. The item is manufactured and then associated with a specific Item-ID. As the item moves from manufacturing, it enters the tracking system at the first reader. The steps are: (1) create disposition indicating "new item" and all desired item properties; and (2) create a batch-ID binding reader and disposition. The system sees a sequence of disposition messages that are processed to create the system data for the new items.

When the item is transferred in a warehouse, the following scenario can take place. Prior to the transfer, the warehouse workers indicate to the system the planned action with the item. If the reader is in a fixed location and there is no ambiguity about the intended location—if, for example, a reader is on the door of a small storeroom or on a conveyor belt leading into a storeroom—then all this information can default. The steps are: (1) create disposition indicating "disposition-location change" and the location. (2) create batch-ID binding reader and disposition. The system sees a sequence of disposition messages that show the location changes.

When the item is shipped the following scenario can take place. Typically, the local ERP or logistics system has an entry that says a certain list of item types and quantities should be shipped to a certain customer at a given destination. The customer may be self. The system may provide the following identification and verification capabilities: (1) Identify the specific items to be shipped. (2) Verify that all the item types and quantities designated are in fact associated with the shipment. For example, verify the shipping and packaging process against the internal ERP system. (3) Identify all shipments intended to go onto a specific transport vehicle, for example the shipments to be loaded onto a specific truck. (4) Verify that all items are indeed loaded onto the correct transport vehicle.

During delivery, the system reports the estimated or actual location of the transport vehicle. In more complex scenarios, the goods may be resold and redirected while they are being transported. The system verifies that the correct items are unloaded at each destination. The system can optionally allow RFID sensing of shipment at its destination to act as proof of delivery and trigger billing. The system can optionally capture delivery time for shipment dynamically and update internal delivery time estimation.

Using these primitives, the following steps can be performed in going from stockroom to shipping. The local ERP system reports a planned shipment to a local ITS. The stockroom clerk uses a system application to: select shipment ID from list; select disposition type of SHIPMENT; identify local reader ID; and produce unique batch-ID. The clerk uses existing procedures to pull items from stock and passes them by the reader. The reader sends a sequence of disposition messages to the system, of the form:

Timestamp Batch-ID Item-ID.

The clerk indicates completion of the batch on the system application. The system application can immediately indicate any discrepancies, such as missing items or extra items. These discrepancies can be fixed locally using the reversal disposition.

Using these primitives, the following steps can be performed in going from shipping to transport. The shipping clerk uses the system to confirm that certain shipments (already known to system) will be loaded onto a certain transport vehicle (e.g., a truck). This action associates a certain reader (at the loading dock for the truck) with a vehicle and, indirectly, with a set of shipments. The result is a batch-ID. The reader sends to the system a sequence of disposition messages of the form:

Timestamp Batch-ID Item-ID.

The clerk indicates completion of the batch on the system application. The system application can immediately indicate any discrepancies, such as missing items or extra items. The system knows the full set of shipments that should be loaded on this truck. These discrepancies can be fixed locally using the reversal disposition. Any query to the system about any specific item shows that it is on this truck and is part of a designated shipment-ID known to the local ERP system. Hence, if an item falls off a truck, all information, both from the system and the local ERP system, can be discovered.

Using these primitives, the following steps can be performed in going from transport to receiving. The truck pulls into a loading dock at one of the shipment points. The system associates the shipping destination address for any given shipment with a known system location. The receiving clerk pulls up the system application and is shown a collection of shipments scheduled for delivery by a certain vendor. Alternatively, the shipping clerk enters the ID of the truck and is given a list of associated shipments. If the tractor part of a tractor-trailer truck changed en route, the driver may carry a shipment designation, or even a tag, to identify unambiguously the shipment(s). Ultimately the clerk uses the same transport data object used by the original shipping clerk(s). Multiple sources may load shipments onto the same truck.

The system application knows precisely which items should be unloaded from the truck, even when multiple shipments are involved. The disposition type is indicated as "unloading at default location". The result is a batch-ID. The reader sends a sequence of disposition messages to the system of the form:

Timestamp Batch-ID Item-ID.

The clerk indicates completion of the batch on the system application. The system can immediately tell whether extra material was unloaded or if part of a shipment is still left on the truck.

Finally, the system knows that the shipments have been delivered, and can trigger a billing message.

Reliability Issues

All messages are delivered, but they may appear in arbitrary order and some may be replayed. The system can accommodate crashes of various computers in the system and the possible replay of accumulated messages. For example, each computer in a chain can accumulate and record to disk a set of messages. When an upstream system crashes and restarts, it can request replay of prior messages or replay what appear to be unsent messages stored locally.

The system can be immune to an arbitrary replay of events. For example, the system may encounter the following:

Timestamp-1 Item X is read and reported as part of batch B1.

Timestamp-2 Item X is read and reported as part of batch B1.

This sequence is a simple repeat and is typically filtered at the lowest level possible, but may be passed to the system.

Next, an operator may discover that moving Item X was a mistake, and enter a reversal:

Timestamp-3 Reversal Item X

Some part of the system may then crash, producing the following replay:

Timestamp-2 Item X is read and reported as part of batch B1.

If the reversal is not replayed, perhaps due to some aspect of how the system crashed, the system will see:

Timestamp-1 Item X is read and reported as part of batch B1.

Timestamp-3 Reversal Item X (batch B1)

Timestamp-2 Item X is read and reported as part of batch B1.

The correct interpretation, however, is no movement of Item X. To get such an interpretation, the reversal is made sticky—for example, reversals are accumulated and effectively replayed after every no-replay event of a given batch.

With an accurate distributed clock (+/−a few milliseconds), the system records the time stamp of each disposition with each item—including reversals. The system could ignore disposition messages that are younger than the latest message received, producing the correct result in the previously described sequence. However, this method does not always produce the correct result.

For example, suppose the events and corresponding timestamps are as follows:

Item X is moved:

Timestamp-1 Item X is read and reported as part of batch B1.

Item X moves again:

Timestamp-2 Item X is read and reported as part of batch B2.

Operator thinks that moving Item X was a mistake:

Timestamp-3 Reversal Item X (batch B2)

The system crashes or some other event causes scrambling, such that the system sees:

Timestamp-2 Item X is read and reported as part of batch B2.

Timestamp-3 Reversal Item X (batch B2)

Timestamp-1 Item X is read and reported as part of batch B1.

The simple algorithm of ignoring all but messages that are newer than the most recently received message for this item means that the system will ignore the batch B1 message and the batch B2 message will be (correctly) ignored. However, the system will think that item X is in the state prior to batch B1, which is wrong. A more effective algorithm during system recovery is to sort all available messages from within the recovery time window by their time stamp and then process all messages in order.

Information Retrieval Scenarios

The system can be implemented to provide a human level query interface, or this can be done by associated systems, or both.

Examples of queries and some capabilities for the query interface, independent of where it is implemented, are as follows.

The basic query is: Where is a specific item? For example: Where is this specific vial of medicine? This query is low cost and easy to implement using conventional query building techniques. Such techniques can also provide a query building mechanism that allows interactive selection of qualifiers like item time, manufacturer, and so on to isolate an individual item. That is, the user may not know the actual item-ID, and may have to query the system to identify medicine manufactured on a certain date and shipped to a certain pharmacy, and so on.

Another query is: Where are the items of a specific type? For example: Where are all the D-cell batteries in the world? There may be numerous item-types (eUPCs) for D-cell batteries, given multiple manufacturers, multiple chemistry types, packaging, and so on. A reasonable interface allows building a query that spans multiple types.

Other queries are: Where are the items in a given geography? For example, Where are all the size D batteries that are within 100 miles from Seattle? Or: Where are the items in a given shipment range? For example: Where are all the size D batteries that are within 4 hours of Seattle? Such queries can be supported by first building a table of expected shipping delays from different geographical locations to Seattle. With this complex geography defined, the system could then search for items within the geographic table.

The system can also support queries such as: Where are all the items with given properties? For example, Where are all the medicine bottles that have (Current date−Creation Date)>2 years? Where are all the radial tires made by Firestone between Jan. 1, 2000 and Jan. 1, 2001? What is the average storeroom-waiting period for this item-type? How long do size D batteries sit in storerooms prior to transfer to a retail location? How long do size D batteries sit on retail shelves until sold?

The system can be implemented to provide various statistical options, for example, to provide for the calculation of the mean, standard deviation, distribution, minimum, and maximum values. Thus, the system can support queries such as: What is the average shipping time between location X and Location Y? For example: How long does it take to ship from Chicago to Seattle for products made by Acme?

Implementation Strategies for Advanced Queries

An overall system, consisting of a federation of ITS implementations that communicate with each other plus additional application software—including a geospatial application—is able to use data gathered from the simple scanning of passive tags to predict dynamically the location of items and answer complex queries. Such queries might otherwise require much more expensive location tracking technology for each item.

Examples of advanced queries include: Where are the Duracell batteries that can be shipped to Seattle within 4 hours using normal shipping methods? All roads through Colorado are closed; which shipments may be affected? What are the estimated current locations of all shipments of ground beef?

Shipping Delay Related Queries

The system knows when a shipment is loaded onto a truck, the destination of the shipment, and when unloading of the shipment at the destination is complete. Hence the system can record and log this information for every pair of starting-location and ending-location appearing in the system. The accumulation of this data allows the system to compute statistics on shipment time, e.g., mean, mode, standard deviation, maximum, minimum, and so on. Hence, time-based queries are possible, such as: Where are the Duracell batteries that can be shipped to Seattle within 4 hours using normal shipping methods?

There are several possible methods for responding to shipping delay queries. For example, in a first method, the steps are as follows: (1) Identify all item-types corresponding to Duracell batteries. (2) Identify, based on item-type, all the stocking locations for Duracell batteries within a certain maximum geography (e.g., Canada and the U.S.) which have available stocks of batteries. (3) Identify all destinations within the Seattle statistical area that have received Duracell batteries in the past. This action is a simple geographical search based on Seattle, battery item types, and accumulated history. (4) Based on the list of destinations from step 3, find all mean shipment time entries with those destinations. Note the starting-location for each shipment delay. (5) Find the intersection of the starting-locations in step 4 with the available stock locations from step 2. (6) Sort the starting-location/destination-location/mean-delay records identified in step 5, based on the delay. Select those where the mean-delay meets the criteria of 4 hours or less. (7) Step 6 gave the answer to the query; the resulting locations may be shown on a map. (8) Other information, such as shipping cost may be available to refine the choice, so that, for example, the system returns the possible sources in order of the lowest shipping cost.

This method only considers starting-locations that have been used in the past to ship to Seattle. The search could be expanded to examine combined historical shipment segments, where the total expected delay, within some tolerance, of the sum of the segments does not exceed the goal given.

The above method can also be easily modified to find the cheapest source of batteries for Seattle, independent of shipment time.

The first method identifies the shipping delays and possible sources of goods based on historical shipments of batteries. A second method uses commercially available route planning software and services. These established solutions estimate an optimized route and driving (or other transportation) time between any two locations in the U.S. or in other countries. Using this technology as a base, the following steps can be used to answer the query: (1) Identify all item-types corresponding to Duracell batteries. (2) Identify, based on item-type, all the stocking locations for Duracell batteries within a certain maximum geography (e.g., Canada and the U.S.) that have available stocks of batteries. (3) Using route-planning software, build a table of driving times from each location with stocks of batteries to Seattle. (4) Sort the table and identify those stock locations that are within 4 hours driving time of Seattle.

This second approach identifies shipping paths that are possible but not often used in practice. For example, for tax and other reasons, Duracell may never ship batteries from Canada to the U.S. The above method might show that the quickest source of batteries from Seattle was Vancouver. It would then be a business judgment whether to use this source.

Shipment Interruption Queries

The system knows the source and destination of all current shipments. The system also knows the start time and average delivery time of each shipment for every pair of starting-location ending-location. Hence, it can respond to queries such as: All roads through the state of Colorado are closed. Which shipments may be affected?

There are several possible methods for responding to shipment interruption queries. For example, in a first method, illustrated using FIG. 7, the steps may be as follows: (1) Identify the geographical region of the travel disruption, for example, the state of Colorado. Approximate the region with a rectangle 710. (2) Identify all current shipments and those planned for time period of interest. (3) For each shipment perform the following steps: (a) Form the bounding box 720 of the starting-location 730 and ending-location 740. (b) Determine whether the bounding boxes intersect or overlap. (c) If they intersect in any way, there is considered to be a potential for disruption. As described later, there may be disruptions even in the absences of an intersection, depending, for example, on highways, mountains, waterways, and so on. See below.

This method provides a basic and general indication of potential disruption. A more specific indication may be formed by looking at the straight-line path 730 from starting-location to ending-location. If the travel disruption intersects this line, there is a stronger indication of potential disruption.

In a second and more precise method, illustrated using FIG. 8, there is the notion of a transport route.

In the second method, steps 1 through 5 of the first method are used to indicate whether the travel disruption 810 is likely to affect a specific shipment. If the bounding box intersects the travel disruption, the details of the planned transport route are examined, for example, by considering way-points 820. If planned route intersects the travel disruption rectangle then there is substantial potential for a disruption. The diagram shows that while the travel disruption blocks the straight-line path, it does not actually block the planned path 810.

In a third method, illustrated using FIG. 9, more detailed routes can be provided. Such routes can be provided either by direct entry of the details of each route, by street name, or by use of route-planning software. Such detailed information allows for more exact detection of disruptions to vehicle transport on established roadways. The steps are: (1) Define the travel disruption 910 in terms of highway or road segments that are blocked. (2) Find all transport-routes 920 for all shipments within the time-window. (3) Match the travel disruption road segments against the planned routes. Where they match, the indicated route will be disrupted.

Real Time Location Presentation and Queries

A Real Time Location System (RTLS) can provide continuous tracking of objects. Such tracking is normally done with a transponder, which may be expensive. The system can take items which carry inexpensive passive RFID tags and give the approximate capability of a RTLS.

Thus, there are two fundamental approaches to location queries. In the first approach, the transportation system (for example, truck, boat, plane) has an RTLS. The real time location of all transportation is monitored, and the system associates from a specific item to the transportation and thence to the location. In the second approach, information gathered from reading passive tags at fixed locations and information about planned shipments is used to approximate the current location of items. This approach is much cheaper and provides many of the benefits of the transportation RTLS approach without needing any RTLS infrastructure. It can also work with third party carriers.

If there are RTLS capabilities on the transportation, the formal shipment process associates a shipment with a mode of transportation. If the transportation is itself a tagged-object, such as a truck with a RTLS-style tag, the system knows the exact location of the shipment at the time of the most recent RTLS update.

An example location query is: Show the estimated current location of all shipments of ground beef. The RTLS method follows these steps: (1) Lookup the item-type of the desired ground-beef shipments. (2) Find all current shipments of this item-type. (3) Identify the transport vehicle associated with each shipment. (4) Find the location of the transportation tagged-object by finding the most recent RTLS update for that tag. (5) Show the current locations graphically, based, for example, on latitude and longitude.

Without RTLS capabilities, the system knows when a shipment is loaded onto a truck, the destination of the shipment, and when unloading of the shipment at the destination is complete. Hence the system can record and log this information for every pair of starting-location ending-location appearing in the system. The system can then compute mean, or average, shipment time. This information allows the system to estimate the current location of a shipment, optionally with confidence ranges.

This method addresses the sample query (show the estimated current location of all shipments of ground beef) as follows: (1) Lookup the item-type of the desired ground-beef shipments. (2) Find the average shipping time for these shipments based on prior history. (3) Find all current shipments of this item-type. (4) Compare, for each shipment, the difference between the recorded start time and the current time, and the average delivery time. This quantity estimates the percentage of the journey completed.

The current location can be estimated and displayed in several different ways.

In the straight-line method, illustrated using FIG. 10, the entire delivery journey is approximated by a direct straight line path from the starting location to the ending location. By computing the estimated percentage 1010 of the journey completed and assuming a straight line path, the location 1020 of the shipment can be estimated. This method does not correspond to real world roads and highways, but it gives an acceptable approximation of the location of the goods relative to the destination.

In another approach, illustrated using FIG. 1, a detailed route for each shipment is constructed, as discussed above. This approach may provide, for example, a detailed sequence of path segments 1110–1118, which can be highlighted on a map. Route planning software can estimate travel time to any give point on the path. For example, in FIG. 1, the estimated drive time to each interchange point is estimated and illustrated. Based on a knowledge of the actual start time, the system can estimate the current position of a delivery vehicle at the level of a specific position on a specific road. This approach is particularly useful for determining the affect of a known transport interruption, such as a closed bridge.

The apparatus and methods of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a cathode ray tube monitor or LCD screen for displaying information to the user and a keyboard and a pointing device such as a mouse or a trackball by which the user can provide input to the computer system. The computer system can be programmed to provide a graphical user interface through which computer programs interact with users.

What is claimed is:

1. A computer program product, tangibly embodied in an information carrier, for use in a commercial data processing environment where the environment includes multiple enterprises in a supply chain, the computer program product being operable to cause data processing apparatus to:

provide the enterprises with real-time visibility of the disposition of items in the supply chain, by:

receiving from a first enterprise multiple instances of tag-read-data, each instance including information read from a tag bound to an item, the information read including a unique tag identifier read automatically from the tag, each instance also including a location of the corresponding tag and its bound item when the tag identifier was read from the tag, the location including a latitude and a longitude, the multiple instances of tag-read-data received from the first enterprise collectively including information read from tags bound to multiple items;

using the tag-read-data received from the first enterprise to maintain disposition information for the items;

receiving from a second enterprise multiple instances of second tag-read-data, each instance including information read from a tag bound to an item, the item being either the same or not the same as the item for which tan-read-data was received from the first enteprise, the information read including a unique tag identifier read automatically from the tag, each instance also including a location of the corresponding tag and its bound item when the tag identifier was read from the tag, the location including a latitude and a longitude, the multiple instances of tag-read-data received from the second enterprise collectively including information read from tags bound to at least one of the multiple items;

using the tag-read-data received from the second enterprise to maintain disposition information for the items, where tag-read-data received from either enterprise for a particular item is used to update the disposition information; and making the disposition information visible to the multiple enterprises in the supply chain, including the first and second enterprises.

2. The product of claim 1, wherein the computer program product is further operable to:

receive from a third enterprise multiple instances of third tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the third enterprise collectively including information read from tags bound to at least one of the multiple items; and use the tag-read-data received from the third enterprise to maintain disposition information for the items, where tag-read-data received from any enterprise for a particular item is used to update the disposition information.

3. The product of claim 1, wherein:

the tags bound to the multiple items include radio frequency identification (RFID) tags, each RFID tag carrying an electronic product code (ePC) as the unique tag identifier.

4. The product of claim 1, wherein:

the visibility is controlled visibility; and the product is further operable to:
  receive authorization information indicating the extent to which the disposition information should be made visible to a particular enterprise within the supply chain; and
  make visible to the particular enterprise only the disposition information which is permitted by the authorization information.

5. The product of claim 4, wherein:

the disposition information includes a plurality of item attributes; and the authorization information specifies, for at least one of the item attributes, the enterprises to which the item attribute can be made visible.

6. The product of claim 1, wherein:

the multiple enterprises include a source enterprise and a destination enterprise;

the source enterprise has an order document for an order placed by the destination enterprise and a shipping document for a physical shipment of goods prepared to satisfy the order placed by the destination enterprise;

visibility includes visibility of relationships between the tag-read-data and business documents including the order document and the shipping document; and providing the enterprises with real-time visibility of the disposition of items further includes:
  receiving shipping information including the following:
    tag identifiers for items corresponding to goods in the shipment;
    information associating each tag identifier with a shipment number for the shipping document, and information associating the shipment number with an order number for the order document;
  correlating the tag-read-data with the shipping information; and
  making the correlations available to the destination enterprise such that the destination enterprise can use a tag identifier for an item in the shipment to confirm the shipment.

7. A system operating in conjunction with multiple enterprises in a supply chain, comprising:

means for receiving from a first enterprise multiple instances of tag-read-data, each instance including information read from a tag bound to an item, the information read including a unique tag identifier read automatically from the tag, each instance also including a location of the corresponding tag and its bound item when the tag identifier was read from the tag, the location including a latitude and a longitude, the multiple instances of tag-read-data received from the first enterprise collectively including information read from tags bound to multiple items;

means for using the tag-read-data received from the first enterprise to maintain disposition information for the items;

means for receiving from a second enterprise multiple instances of second tag-read-data, each instance including information read from a tag bound to an item, the item being either the same or not the same as the item for which tag-read-data was received from the first enterprise, the information read including a unique tag identifier read automatically from the tag, each instance also including a location of the corresponding tag and its bound item when the tag identifier was read from the tag, the location including a latitude and a longitude, the multiple instances of tag-read-data received from the second enterprise collectively including information read from tags bound to at least one of the multiple items;

means for using the tag-read-data received from the second enterprise to maintain disposition information for the items, where tag-read-data received from either enterprise for a particular item is used to update the disposition information; and means for making the disposition information visible to the multiple enterprises in the supply chain, including the first and second enterprises.

8. The system of claim 7, further comprising:

means for receiving from a third enterprise multiple instances of third tag-read-data, each instance including information read from a tag bound to an item, the information read including a unique tag identifier read automatically from the tag, each instance also including a location of the corresponding tag and its bound item when the tag identifier was read from the tag, the multiple instances of tag-read-data received from the third enterprise collectively including information read from tags bound to at least one of the multiple items; and means for using the tag-read-data received from the third enterprise to maintain disposition information for the items, where tag-read-data received from any enterprise for a particular item is used to update the disposition information.

9. The system of claim 7, wherein:

the tags bound to the multiple items include radio frequency identification (RFID) tags, each RFID tag carrying an electronic product code (ePC) as the unique tag identifier.

10. The system of claim 7, wherein:

the visibility is controlled visibility; and the system further comprises:
  means for receiving authorization information indicating the extent to which the disposition information should be made visible to a particular enterprise within the supply chain; and
  means for making visible to the particular enterprise only the disposition information which is permitted by the authorization information.

11. The system of claim 10, wherein:
the disposition information includes a plurality of item attributes; and
the authorization information specifies, for at least one of the item attributes, the enterprises to which the item attribute can be made visible.

12. The system of claim 7, wherein:
the multiple enterprises include a source enterprise and a destination enterprise;
the source enterprise has an order document for an order placed by the destination enterprise and a shipping document for a physical shipment of goods prepared to satisfy the order placed by the destination enterprise;
visibility includes visibility of relationships between the tag-read-data and business documents including the order document and the shipping document; and
means for providing the enterprises with real-time visibility of the disposition of items further include:
  means for receiving shipping information including the following:
    tag identifiers for items corresponding to goods in the shipment;
    information associating each tag identifier with a shipment number for the shipping document, and information associating the shipment number with an order number for the order document;
  means for correlating the tag-read-data with the shipping information; and
  means for making the correlations available to the destination enterprise such that the destination enterprise can use a tag identifier for an item in the shipment to confirm the shipment.

13. A method for use in a commercial data processing environment that includes multiple enterprises in a supply chain, comprising:
receiving from a first enterprise multiple instances of tag-read-data, each instance including information read from a tag bound to an item, the information read including a unique tag identifier read automatically from the tag, each instance also including a location of the corresponding tag and its bound item when the tag identifier was read from the tag, the location including a latitude and longitude, the multiple instances of tag-read-data received from the first enterprise collectively including information read from tags bound to multiple items;
using the tag-read-data received from the first enterprise to maintain disposition information for the items;
receiving from a second enterprise multiple instances of second tag-read-data, each instance including information read from a tag bound to an item, the item being either the same or not the same as the item for which tag-read-data was received from the same enterprise, the information read including a unique tag identifier read automatically from the tag, each instance also including a location of the corresponding tag and its bound item when the tag identifier was read from the tag, the location including a latitude and longitude, the multiple instances of tag-read-data received from the second enterprise collectively including information read from tags bound to at least one of the multiple items;
using the tag-read-data received from the second enterprise to maintain disposition information for the items, where tag-read-data received from either enterprise for a particular item is used to update the disposition information; and
making the disposition information visible to the multiple enterprises in the supply chain, including the first and second enterprises.

* * * * *